(No Model.)

H. A. CHASE.
ELECTRIC ALARM COMPASS.

No. 385,043. Patented June 26, 1888.

Witnesses.
John F. Nelson.
B. J. Noyes.

Inventor.
Henry A. Chase,
by Crosby & Gregory
Attys.

UNITED STATES PATENT OFFICE.

HENRY A. CHASE, OF NEWTON, MASSACHUSETTS.

ELECTRIC ALARM COMPASS.

SPECIFICATION forming part of Letters Patent No. 385,043, dated June 26, 1888.

Application filed February 16, 1885. Renewed July 13, 1887. Serial No. 244,143. (No model.)

*To all whom it may concern:*

Be it known that I, HENRY A. CHASE, of Newton, county of Middlesex, State of Massachusetts, have invented an Improvement in Mariners' Compasses, of which the following description, in connection with the accompanying drawings, is a specification, like letters on the drawings representing like parts.

My invention, relating to mariners' compasses, has for its object to provide means for producing an alarm in case the vessel departs from the course upon which it is to be kept.

My invention consists, essentially, in the combination, with the magnetic needle, of an electric circuit having terminals co-operating with the needle and mechanism whereby the latter, if removed from the position with relation to the compass-box and vessel that it is desired to keep, will cause the said circuit to be closed and an alarm thereby sounded, the said alarm being located at any desired point—as, for instance, in the state-room of the captain or other officer of the vessel, as might be desired.

Figure 1 is a plan view of a compass provided with alarm-operating mechanism embodying this invention; Fig. 2, a vertical section thereof, showing a portion of the mechanism in elevation; and Fig. 3, an elevation of a clock or motor having a uniform rate of speed co-operating with the compass and alarm mechanism, as hereinafter described.

The magnetic needle $a$, supported on the pivot $b$, connected with the box or frame-work $c$, hung upon gimbals, may all be of any suitable or usual construction, the bottom plate of the said box being connected by bars $c'$ with the inner ring of the gimbal-joint. The outer ring of the gimbal-joint is electrically divided by insulating material $e$ into two parts, $d$ $d'$, one of which is in electric connection with one of the pivots, $f$, and the other with the other pivot, $f'$. The inner ring of the gimbal-joint is divided electrically into two concentric metallic portions, $g$ $g'$, insulated from one another, the former being pivoted and electrically connected with the portion $d$ of the outer ring, and the latter portion, $g'$, of the inner ring being pivoted and electrically connected with the portion $d'$ of the outer ring, so that the two portions $g$ $g'$ of the inner ring constitute the terminals of an electric circuit connected with the pivots $f f'$.

The needle $a$ is adapted, when raised bodily on its pivot $b$, to come into electrical connection with both portions $g$ $g'$ of the inner ring, thus electrically connecting them together and completing or closing the circuit connected with the pivots $f f'$.

The compass is provided with an insulating guard or shield, $h$, of sufficient width to be interposed between the ends of the needle $a$ and portions $g$ $g'$ of the ring, thus preventing the needle, when bodily raised, from connecting the said portions or closing the circuit, provided that the needle is then in line with the said shield. The shield $h$ may be turned to any position, so as to coincide with the position of the needle for the particular course upon which the vessel is to be kept, by means of a gear, $i$, connected with the said shield and adapted to be operated by a pinion, $k$, provided with a knob or handle, $m$, which will be locked, so as to be accessible for operation only to an authorized officer, the said pinion being normally disengaged from the said gear, but adapted to be brought forward into engagement therewith by the longitudinal movement of its shaft when it is desired to move the shield or to lay a new course for the vessel.

The needle $a$ is raised at short intervals of time in order to close the circuit $g$ $g'$ in case the shield $h$ is moved out of line with the said needle, as shown in Fig. 1, so that in case the vessel has departed from the proper course the said circuit will be closed, in order to operate a suitable alarm or signal and call attention to the fact. As herein shown, the needle is raised by the following mechanism: Its pivot $b$ is supported on the upper end of a vertically-movable shaft, $n$, preferably made in two parts, screw-threaded for adjusting its length, the said shaft being connected by a system of levers, $n'$ $n^2$, and link $n^3$, with the armature or core $o$ of an electro-magnet or solenoid, $o'$, supported on frame-work $o^2$, depending from the box or compass frame-work $c$. The said magnet $o'$ is in an electric circuit, 2 3, containing a circuit-closer, p, operated at definite intervals of time by a portion, p', of a clock or mechanical motor, C, having a uniform rate of movement. Thus, during a few seconds of each minute or other interval of time the circuit of the magnet o' will be closed, and the latter by its attraction will cause the needle a to be raised, when, if the needle is in line with the shield h, as it should be, no effect will be produced, but if the said needle is not in line with the said shield, as will be the case if the vessel has departed from the course, the said needle will connect the portions g g' of the ring, closing the circuit 4 5 and causing an alarm or other signal, S, to be operated, and thus calling the attention of the proper officer to the fact that the vessel is no longer on the proper course. As shown in this instance, the circuit 4 5 from the ring g g' and pivots f f' passes through a battery, B, and vibrating signal S, of usual construction, the latter being sounded while the needle is raised by the magnet o' if the vessel is off the course, so that the needle does not coincide in position with the shield h.

The clock C is shown as having two revolving dials, D D', the former revolving once in a day and having twenty-four-hour divisions, while the latter revolves once an hour. The clock is provided with a finger, F, which may be engaged with any one of a series of holes in the dial D, and will be carried around with the said dial. The said finger F has a projection, r, which in its revolution will act upon a circuit-closer, r', in circuit with the signal S, which is preferably mounted on the clock, as shown in Fig. 3, although it is shown separately in diagram to illustrate its circuit-connection with the apparatus of Figs. 1 and 3.

By setting the finger F at any desired point on the dial D the said finger may move any length of time less than twenty-four hours before reaching the circuit-closer r' and operating the signal S. The officer may thus set the shield h of the compass on any desired course, and then place the finger F with the projection r at a distance from the circuit-closer r' corresponding to the number of hours that he wishes the vessel to remain on the said course, and if during the said time the ship is off her course the signal S will be operated, because of the needle a closing the circuit 4 5 at g g', and if the vessel remains on the course all the time, the alarm S will be sounded at the end of the interval of time by the circuit-closer r' closing the circuit 6 7 of the said signal S, and thus calling attention to the fact that it is time to lay a new course.

By having the circuit-terminals consist of concentric rings in a plane parallel with but removed from that in which the needle moves, the said needle may co-operate with the said terminal pieces when in any position, except when it is prevented by the shield, and the apparatus does not interfere with the free pivotal movement of the needle. The circuit is closed by the positive bodily movement of the needle and not by the slight pressure due to its magnetic attraction.

I claim—

1. A compass-needle having an angular or pivotal movement, and electrical actuating mechanism for moving the said needle bodily in the direction of the axis of the pivot, and an electric circuit controlled by the said needle, substantially as described.

2. The combination of the pivoted needle of a mariner's compass with an electric circuit having terminals co-operating with the said needle, and a shield movable with relation to the compass-box or supporting frame-work of the said needle, the said shield, when in line with the needle, preventing the latter from affecting the said circuit, substantially as and for the purpose described.

3. A pivoted compass-needle and actuating mechanism for moving the needle-pivot, combined with an electric circuit under control of the said needle, and a mechanical motor or clock controlling the movement of the needle-pivot, substantially as described.

4. A compass-needle and supporting-ring therefor, constituting the terminals of an electric circuit, combined with an angularly-movable shield interposed between the said ring and needle, and mechanism for moving the said needle bodily toward the said ring, substantially as described.

5. A compass-needle having an angular and bodily movement and electric circuit controlled thereby, itself controlling the operation of a signal, combined with a clock or motor controlling the bodily movement of the said needle and also controlling the signal, substantially as described.

6. A compass-needle having a movable pivot, combined with a gimbal-joint support for the said needle, forming part of an electric circuit controlled thereby, a non-conducting shield, and mechanism for moving the said needle-pivot, whereby it is caused to close the circuit except when it coincides in position with the said shield, substantially as described.

7. The combination, with a pivoted magnetic needle, of circuit-terminals consisting of rings, the plane of which is parallel with the plane of movement of the said needle, which, when moved bodily into contact with the said rings, affords electrical connection between them, substantially as described.

8. The needle and circuit-terminals co-operating therewith, combined with the movable shield and actuating mechanism for the said shield normally disengaged therefrom, substantially as described.

9. A compass-needle having an angular or pivotal movement, and actuating mechanism for moving the said needle bodily in the direction of the axis of the pivot, and a mechanical motor or clock controlling the said bodily movement of the needle, as and for the purpose set forth.

10. A compass-needle having an angular and bodily movement, and electric circuit controlled thereby, itself controlling the operation of a signal, combined with a clock or motor controlling the bodily movement of the said needle, substantially as described.

In testimony whereof I have signed my name to this specification in the presence of two subscribing witnesses.

HENRY A. CHASE.

Witnesses:
   JOS. P. LIVERMORE,
   B. J. NOYES.